Oct. 21, 1958     I. E. ASKE     2,857,152
HYDRAULIC SCALE WITH FLEXIBLE TUBES
Filed Aug. 11, 1952     3 Sheets-Sheet 1
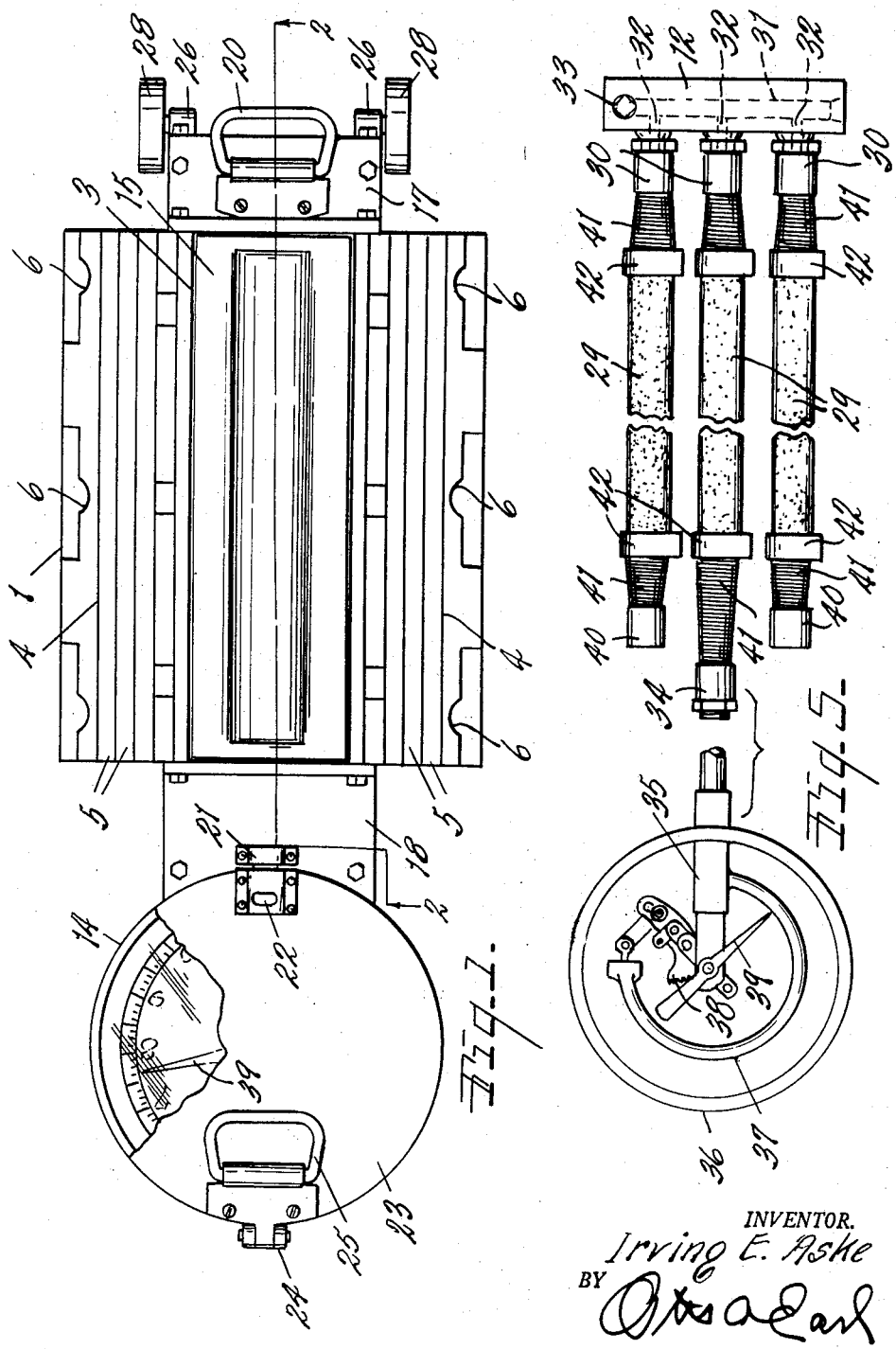
INVENTOR.
Irving E. Aske
BY
Otis a Earl
Attorney.

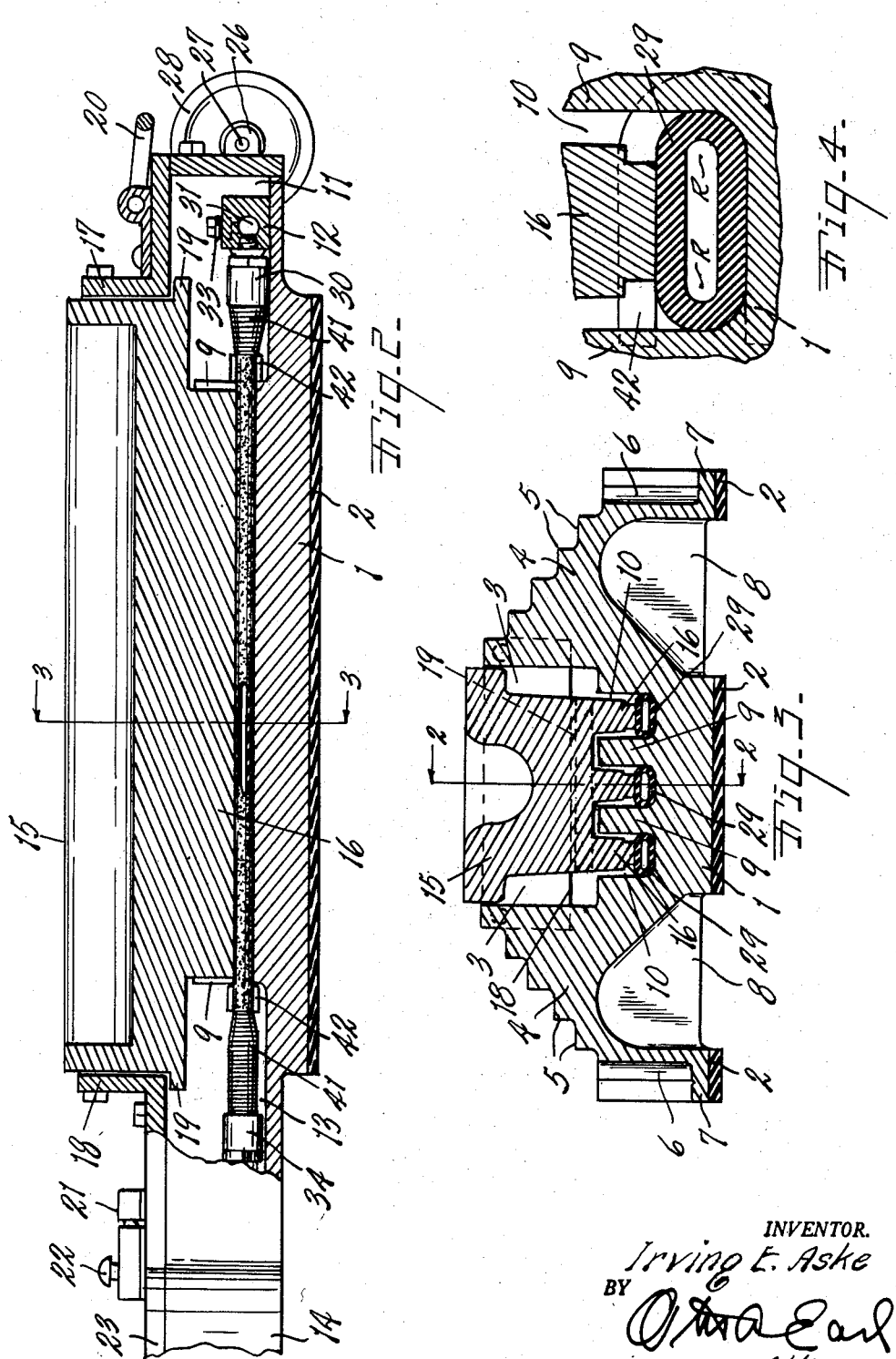

INVENTOR.
Irving E. Aske
BY
Otto A. Earl
Attorney

United States Patent Office 2,857,152
Patented Oct. 21, 1958

2,857,152

HYDRAULIC SCALE WITH FLEXIBLE TUBES

Irving E. Aske, Muskegon, Mich.

Application August 11, 1952, Serial No. 303,752

13 Claims. (Cl. 265—47)

This invention relates to improvements in Hydraulic Scale.

The principal objects of this invention are:

First, to provide a hydraulic scale particularly adapted for weighing heavy loads such as the wheel loads of trucks.

Second, to provide a hydraulic scale in which a hydraulic pressure gauge records the fluid pressure in a closed pressure system created by a pressure member having a known area in contact with the system, the gauge being calibrated in weight units.

Third, to provide a closed fluid system for a hydraulic scale that will sustain the weight on the scale and transmit the pressure created thereby to a gauge without errors created by friction or flexing in the walls of the system.

Fourth, to provide a hydraulic scale which employs a standard gauge and conduits as pressure recording and transmitting elements.

Fifth, to provide a hydraulic scale which remains accurate in spite of temperature changes of the scale and its fluid medium.

Sixth, to provide a high load hydraulic scale that is accurate and inexpensive to manufacture, and which can be made as a single portable unit or as a fixed installation using multiple pressure units.

Other objects and advantages of the invention will be apparent from a consideration of the following description and claims.

The drawings, of which there are three sheets, illustrate a highly practical embodiment of the invention.

Fig. 1 is a plan view partially broken away of a complete scale made as a portable unit.

Fig. 2 is a fragmentary longitudinal cross sectional view through the scale taken along the plane of line 2—2 in Fig. 1.

Fig. 3 is a fragmentary transverse cross sectional view through the body of the scale taken along the plane of the line 3—3 in Fig. 2.

Fig. 4 is a fragmentary enlarged cross sectional view through one of the pressure hoses and the adjacent portions of the scale.

Fig. 5 is a plan view partially broken away of the fluid retaining and pressure indicating system of the scale.

Figure 6:
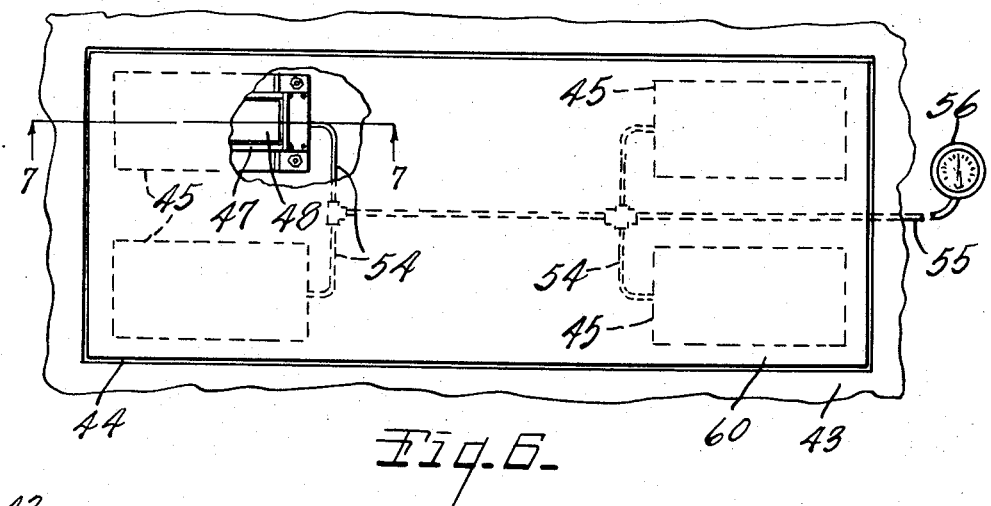
Fig. 6 is a plan view of a stationary installation including multiple pressure elements.

The first form of the scale illustrated in Figs. 1 to 5 includes a base or body 1 that is desirably cast in relatively thick proportions from aluminum in order to be both light and capable of withstanding heavy loads such as will be applied thereto by a highway truck. The base is flat on its bottom and has rubber pads 2 applied thereto in order to have full supporting engagement with the road surface. The body is thickest along its longitudinal center and is provided with an upwardly opening chamber 3 which extends longitudinally through the mid portion of the body. Side reinforcing and ramp portions 4 are formed along the sides of the body intermediate of its ends. The tops of the ramp portions are stepped as at 5 to provide traction surfaces and to provide increased surface area which is desirable in casting aluminum bodies to reduce shrinkage. Semicircle cavities 6 are provided along the edges of the ramp portions in case it is desired to drill bolt holes through the side flanges 7 and permanently mount the scale on a fixed foundation. Stiffening ribs 8 are provided underneath the ramp portions 4.

The bottom of the recess 3 is provided with longitudinally extending ribs 9 which coact with the sides of the recess and each other to form a plurality of channels 10 extending longitudinally through the mid portion of the body. At one end of the ribs 9 the body of the scale forms a chamber 11 in which a header bar 12 is freely and loosely received. The other end of the body beyond the ribs 9 forms a second chamber 13, the walls of which are extended and enlarged to form a circular gauge case 14 as shown in Fig. 1. It is pointed out that the ends of the body which form the chambers 11 and 13 are spaced upwardly above the level of the bottom of the center portion of the body (see Fig. 2).

A pressure member or bar 15 is freely received between the side walls of the chamber 3 and is provided on its under side with a plurality of longitudinally extending depending rails 16 that extend into the channels 10 as will be described. End caps of angular cross section 17 and 18 are movably bolted to the ends of the body 1 over the chambers 11 and 13 respectively and at each end of the central recess 3 and the pressure member 15. The ends of the pressure member 15 are provided with longitudinally extending lugs or ears 19 that project underneath the cover plates 17 and 18 in spaced relationship to retain the pressure member within the recess 3. One cover plate 17 desirably has a swingable handle 20 thereon, while the other cover plate 18 carries a keeper 21 that coacts with a latch bolt 22 mounted on a cover 23 hinged to the gauge housing 14 at 24. The gauge housing cover 23 also desirably carries a second handle 25 to facilitate movement of the scale. The opposite end of the body from the scale housing is provided with journals 26 for the pins 27 on which rollers or wheels 28 are mounted. The wheels are slightly above the plane of the bottom of the base so as not to interfere with the weighing operation. The entire scale is thus easily handled.

The weight indicating apparatus mounted within the body 1 and coacting with the pressure member 15 consists of a plurality of flexible hoses 29, three hoses being illustrated in the present example. The hoses are of the type known as high pressure hose used for transmitting and handling fluids under pressure in hydraulic and pneumatic pressure systems. The hoses are originally circular in cross section and smaller in outside diameter than the width of the channels 10 in the body. The hoses extend completely through the channels 10, and at their right ends as shown in Figs. 1, 2, and 5 are coupled by pressure sealing couplings 30 to the header bar 12. The header bar 12 has a common passage 31 formed therein communicating with each of the hoses 29 through branch passages 32. A releasable plug 33 closes the common passage 31. The opposite end of the center hose 29 is connected by means of a high pressure coupling 34 with the pressure connection 35 of the pressure gauge 36. The gauge 36 is a familiar type of pressure indicating instrument and includes a Bourbon tube 37 connected to actuate the pivoted rack 38 for rotating the indicating finger 39. The other ends of the other two hoses 29 are permanently closed by pressure plugs 40.

Particular attention is now directed to the coaction between the rails 16 on the pressure member and the hoses 29, and the walls of the channels 10. In order to eliminate errors in the functioning of the scale I use hoses 29 having a wall thickness and rated bursting strength that is less than the pressure which will be created within the hoses by application of a maximum load to the scale. This results in the walls of the hoses being relatively flexible and in their offering substantially no resistance to deflection. The hoses 29, gauge 36 and header bar 12 are completely filled with hydraulic fluid and placed in the body 1 with the plug 33 closed and the hoses circular in cross section. The pressure member 15 is then fitted into the recess 3 with the rails 16 resting upon the hoses 29. The body 1 is placed on a hydraulic press equipped with pressure indicating apparatus and a load is applied to the pressure member 15 by the press. Since the rails 16 first contact the hoses 29 along a relatively small area of the circular hoses, the unit pressure created in the hoses and indicated by the gauge 36 is relatively high. The scale is calibrated by slowly bleeding the hydraulic fluid from the header bar 12 by slightly loosening the screw plug 33. This permits the hoses 29 to deflect downwardly underneath the rails 16 until the full horizontally projected area of the rails 16 is in pressure transmitting contact with the deformed hoses as is shown in Fig. 4. With a known horizontally projected area on the bottoms of the rails 16 the unit fluid pressure within the hoses can be multiplied by this total area of the rails to arrive at the total load applied to the hoses by the pressure member. I prefer to use a total rail area of twenty square inches. Most desirably the bottoms of the rails are flat as this is the easiest surface to machine, but other surfaces could be used.

It is pointed out that the cross sectional shape of the bottoms of the channels 10 conforms to the natural deflected oval shape of the hoses 29 so that the hoses are supported along their bottoms and sides within the channels. The width of the rails 16 is desirably equal to the spacing between the centers of radii of the inner surface of the hoses as indicated at "R" in Fig. 4. The rails may be narrower than this spacing but this decreases the area of the rails and increases the unit pressure in the system for a given load. The width of the rails may slightly exceed the distance between the radii centers without seriously effecting the accuracy of the scale, as all load applied to the hose by the rail is resisted and supported by pressure in the fluid in the hose and by negligible transverse flexing of the upper wall of the hose. However, as the width of the rail substantially exceeds the space between the internal radii centers of the hose, part of the load on the rail is supported by the side walls of the hose and error is thrown into the scale. As was previously stated, the rated capacity of the hoses 29 is desirably less than the pressure to which they will be subjected by maximum load applied to the scale. This eliminates any error by reducing the resistance of the wall of the hose to flexing. Most pressure hoses commercially available will actually withstand more than their rated pressure capacity, as a safety factor is incorporated in their construction and rating. However, in order to insure against bursting of the hoses and to permit the use of as light a hose as possible, it is desirable to wrap or reinforce the end portions of the hoses as at 41 where the hoses are not confined between the rails and the walls of the channels 10. For a scale of ten ton capacity and having a total effective rail area of twenty square inches, it has been found that a pressure hose having a ¾" outside diameter and a ⅛" wall thickness is satisfactory if having a pressure rating of 750 pounds per square inch. Such a hose will be compressed to approximately 15/16" across with no change in outside circumference or internal stress in its walls. When subjected to a ten ton load applied over twenty square inches the unit pressure within the closed system will be one thousand pounds per square inch.

After the calibrated load has been applied to the pressure member 15 and the fluid in the hoses permitted to escape until the hoses are flat, a point will be reached in which the gauge 36 will indicate the same total load as that shown by the master gauge on the hydraulic press. At this point the bleed plug 33 is permanently and tightly closed thus leaving the fluid system in completely filled and calibrated condition. Release of the load from the pressure member naturally removes the pressure from the hoses and the gauge, but the hoses do not return to circular cross section because the fluid has no tendency to expand and because atmospheric pressure on the outside of the hoses will retain them in collapsed position.

The natural tendency of the hoses 29 to return to circular cross section, while being slight, will tend to create a vacuum in the system when it is not loaded. It is therefore desirable to use an oil in the system that does not create a vapor pressure when exposed to a vacuum. I have found that a light silicone oil is satisfactory from this standpoint. The natural tendency for the hoses to return to circular cross section is greatest toward the ends where they remain circular. To restrict this tendency and assure a flat bearing surface with the rails 16, U-clips 42 are fitted over the hoses outwardly from the ends of the rails. The clips have sufficient strength to hold the hoses flat. Desirably the bottoms of the channels 10 extend slightly longitudinally beyond the ends of the rails 16 as shown.

The oil or fluid should also have a low coefficient of thermal expansion, although the scale and system is self compensating for atmospheric temperature changes. Thermal expansion of the fluid merely swells or rounds the hoses slightly without increasing the pressure in the system to any appreciable extent, since the natural tendency of the hoses is to return to round shape. The pressure member 15 is raised slightly by this swelling but clearance for this rise is provided between the ears 19 and the undersides of the end covers 17 and 18.

The successful construction and operation of the scale is not limited to the particular arrangement of hoses, rails, and channels illustrated and it is pointed out that the scale essentially consists of a closed fluid system including the fluid pressure gauge and a deformable or flexible walled chamber. The base should be of sufficient strength to support the load to be applied and it is pointed out that the hose may be mounted or supported at different angles to oppose forces from different directions. The base must provide support for the bottom and sides of the effective or load supporting portion of the flexible chamber where the unit pressure to be created within the chamber by the maximum load on the scale exceeds the designed safe operating pressure for the chamber. The pressure member is guided by the base relative to the flexible chamber but may be arranged to be acted upon by various loads from various angles. The pressure rail may be in one part or several parts as is illustrated and need not be straight but its effective contact area with the flexible wall of the chamber must be accurately known. The portion of the pressure chamber in contact rail must be unsupported except by contact with the fluid and by a transversely flexible connection along its edges to the remainder of the chamber. To be self compensating for thermal expansion, the walls of the chamber must be capable of flexing into a cross section of greater internal area without placing the walls under tension or other stresses.

Figure 9:
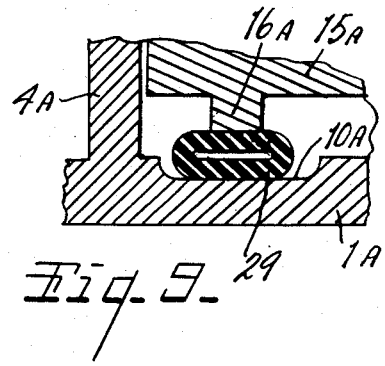
Fig. 9 is a fragmentary cross sectional view illustrating a modified form of pressure chamber mounting that may be used in light load applications of either form of the scale.

It is pointed out that the example of the scale illustrated in Figs. 1 to 5 is designed to utilize standard hydraulic hose as a pressure chamber with the hose having a designed bursting pressure characteristic that is less than the unit pressure to be created in the chamber by the maximum load on the scale. For this reason the side walls of the channels engage and support the working portion of the hose against bursting and the ends of the hoses outside of the channels are reinforced as described. The relatively low pressure characteristic of the hose results in the top wall of the hose being relatively flexible so as not to introduce error into the scale reading when the top wall flexes slightly. When the total load to be applied to the hose or pressure chamber divided by the contact area of the rail or pressure element is less than the rated bursting strength of the hose it is not so essential to laterally support the side walls of the hose against bursting. For instance, a ten thousand pound total load applied through a pressure rail of twenty square inches would create a pressure of five hundred pounds per square inch in the hose and if the hose had a resistance to bursting greater than five hundred pounds per square inch it would be unnecessary to support the sides of the hose. A modified structure indicating this arrangement is illustrated in Fig. 9 wherein the base 1A is provided with a relatively wide and shallow channel 10A serving to loosely locate the hose 29. The pressure element 15A is guided with respect to the base by the side wall 4A while the rail 16A engages the intermediate portion of the top wall of the hose.

Figure 7:
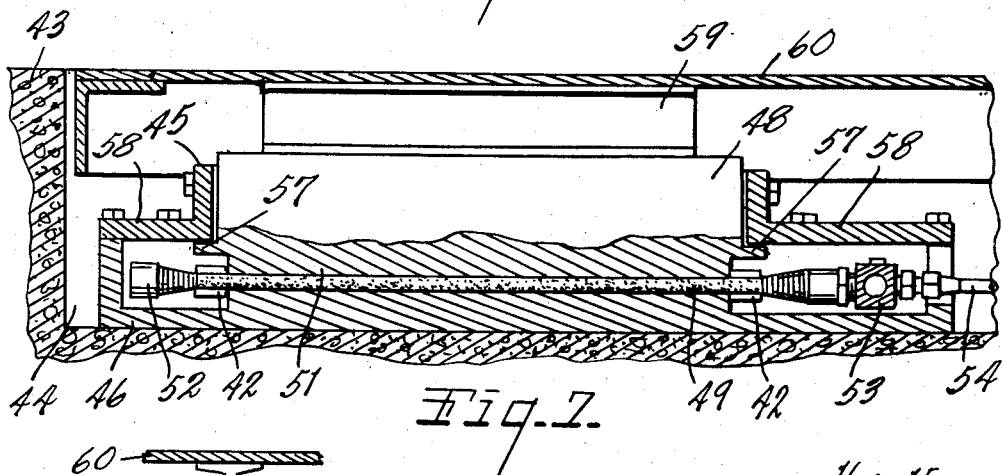
Fig. 7 is a fragmentary cross sectional view along the line 7—7 in Fig. 6.
Figure 8:
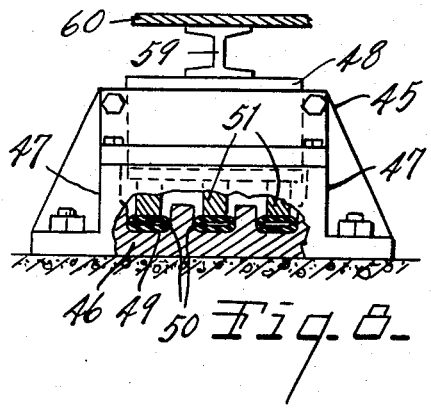
Fig. 8 is a fragmentary cross sectional view along the line 8—8 in Fig. 7.

While the scale disclosed in Figs. 1 to 5 is provided with integral ramp portions for use on a flat roadway, it is contemplated that the scale with the same or similar case might be used by placing it in a pit or recess in a roadway. A removable cover for the recess would protect the scale when not in use and permit unobstructed use of the roadway. Figs. 6 to 8 illustrate a permanent installation and modification of the single unit scale adapted to simultaneously weigh the load on an entire axle or tandem axle unit. Walls 43 form a pit 44 in a roadway and four pressure units indicated generally at 45 are positioned one in each corner of the pit as illustrated. The pressure units 45 each include a base 46 supported on the bottom of the pit and having side walls 47 forming an upwardly opening chamber within which the pressure member 48 is freely vertically movable. A plurality of pressure hoses 49 are supported on the bottom of the recess and where the unit pressure in the hoses are expected to exceed the bursting pressure of the hose the sides of the hoses are laterally supported by channel walls 50 formed on the bottom of the base. Load transmitted rails 51 projecting from the bottom of the pressure member 48 have a known total contact area with the hoses. The hoses are filled with liquid and flattened as in the first form of the scale.

One end of each of the hoses in each unit is capped as at 52 while the other ends of the hoses are interconnected by rigid headers 53. The headers of the several units are interconnected by rigid walled conduits 54 and it is pointed out that these conduits are desirably of small cross section to reduce the volume of liquid required to fill the system. The small volume of liquid reduces the expansion volume of the liquid which must be accommodated by the hoses 49 upon thermal expansion of the liquid. A lead conduit 55 connects the conduits 54 to a hydraulic scale 56 which can be conveniently located at some position remote from the pit.

The pressure elements 48 are provided with lugs 57 on each end and the lugs are spaced below end cover plates 58 secured to the ends of the base 46. The pressure members 48 are provided with longitudinal extending ribs 59 along their top surfaces which support a platform 60 of suitable strength within the pit and consolidate loads applied through the platform along the mid sections of the load members.

It is pointed out that the lugs 57 on the pressure members and the coacting cover plates 58 have a special function in the multiplied unit form of the scale. As a truck drives upon the platform 60 the entire weight will be applied to the scale units along the front side of the assembly and the pressure created in the liquid will tend to expand the hoses in the unloaded scale units. However, the lugs 57 on the unloaded units will immediately engage and be stopped by the cover plates 58 to maintain the known area of the rails 51 in load transmitting contact with the hoses in the unloaded units. The unit pressure developed in the hoses and in the gauge 56 therefore continues to accurately reflect the total applied load divided by the total contact area of all of the rails in all of the units and the gauge 56 will accurately read the total load regardless of the position of the load on the platform.

Scales of the type described can be inexpensively manufactured and installed and constantly maintain a sufficient degree of accuracy to determine whether or not a truck is within the limits permitted by highway loading laws.

Having thus described my invention, what I claim as new and desire to secure by Letters Patent is:

1. A weighing scale comprising, a base having an oblong recess in the top thereof, a plurality of parallel ribs extending longitudinally along the bottom of said recess and through the mid portion thereof and forming a plurality of channels with rounded lower corners, a pressure member slidably received in said recess and projecting above said body, a plurality of rails on the bottom of said member extending into said channels, the bottom surfaces of said rails being coplanar and narrower than said channels, flexible walled hoses positioned in said channels and supportingly engaging said rails, said hoses being deformed to oval cross section, the curvature of the bottom of said channels conforming to and substantially equalling the natural deformed shape of said hoses to support the bottoms and sides thereof, the lateral sides of said rails being positioned approximately over the centers of radii of curvature of the sides of said hoses, a rigid header connecting and affording communication between said hoses and located in said recess at one end thereof beyond said rails and ribs, a scale housing connected to said base at the opposite end thereof from said header, a hydraulic scale positioned in said housing and hydraulically connected to the other end of one of said hoses, plugs in the other ends of the others of said hoses and located in the other end of said recess from said header, reenforcing wrappings applied to the exposed ends of said hoses where they project beyond said rails, cover plates removably secured to said body over the ends of said recess, projections on the ends of said pressure member disposed in spaced relationship below said cover members, a cover for said scale housing hingedly connected thereto, wheels mounted on the opposite end of said body from said housing and disposed slightly above the bottom of the body, a handle on said housing, a dial on said scale calibrated in weight units corresponding to the unit pressure in said scale multiplied by the area of the bottoms of said rails, a body of liquid filling said hoses, header and scale, and a closable filler opening to said body of liquid formed in said header, the bottoms of said rails being in full contact with said hoses.

2. A weighing scale comprising, a base having an oblong recess in the top thereof, a plurality of parallel ribs extending longitudinally along the bottom of said recess and through the mid portion thereof and forming a plurality of channels with rounded lower corners, a pressure member slidably received in said recess and projecting above said body, ramp portions on the sides of said body leading to the top of said pressure member, a plurality of rails on the bottom of said member extending into said channels, the bottom surfaces of said rails being narrower than said channels, flexible walled hoses positioned in said channels and supportingly engaging said rails, said hoses being of flattened cross section with rounded sides, the curvature of the bottom of said channels conforming to and substantially equalling the shape of said hoses to support the bottoms and sides thereof, the lateral sides of said rails being positioned approximately over the centers of curvature of the sides of said hoses, a rigid header connecting and affording communication between said hoses and located in said recess at one end thereof beyond said rails and ribs, a scale housing connected to said base at the opposite end thereof from said header, a hydraulic scale positioned in said housing and hydraulically connected to the other end of one of said hoses, plugs in the other ends of the others of said hoses and located in the other end of said recess from said header, reenforcing wrappings applied to the exposed ends of said hoses where they project beyond said rails, cover plates removably secured to said body over the ends of said recess, projections on the ends of said pressure member disposed in spaced relationship below said cover members, a cover for said scale housing hingedly connected thereto, wheels mounted on the opposite end of said body from said housing and disposed slightly above the bottom of the body, a handle on said housing, a dial on said scale calibrated in weight units corresponding to the unit pressure in said scale multiplied by the area of the bottoms of said rails, a body of liquid filling said hoses, header and scale, and a closable filler opening to said body of liquid formed in said header, the bottoms of said rails being in full contact with said hoses.

3. A weighing scale comprising, a base having an oblong recess in the top thereof, a plurality of parallel ribs extending longitudinally along the bottom of said recess and through the mid-portion thereof and forming a plurality of channels with rounded lower corners, a pressure member slidably received in said recess and projecting above said body, a plurality of rails on the bottom of said member extending into said channels, the bottom surfaces of said rails being narrower than said channels, flexible walled hoses positioned in said channels and supportingly engaging said rails, said hoses being of flattened cross section with rounded sides, the curvature of the bottom of said channels conforming to and substantially equalling the shape of said hoses to support the bottoms and sides thereof, the lateral sides of said rails being positioned approximately over the centers of curvature of the sides of said hoses, means connecting and affording communication between said hoses, a scale housing connected to said base, a hydraulic scale positioned in said housing and hydraulically connected to one of said hoses, means closing the unconnected ends of said hoses, reenforcing wrappings applied to the exposed ends of said hoses where they project beyond said rails, cover plates removably secured to said body over the ends of said recess, projections on the ends of said pressure member disposed in spaced relationship below said cover members, wheels mounted on the opposite end of said body from said housing and disposed slightly above the bottom of the body, a handle on said housing, a dial on said scale calibrated in weight units corresponding to the unit pressure in said scale multiplied by the area of the bottoms of said rails, a body of liquid filling said hoses, header and scale, and a closable filler opening to said body of liquid, the bottoms of said rails being in full contact with said hoses.

4. A weighing scale comprising, a base having a recess in the top thereof, a plurality of parallel ribs extending along the bottom of said recess and through the mid-portion thereof and forming a plurality of channels with rounded lower corners, a pressure member slidably received in said recess and projecting above said body, a plurality of rails on the bottom of said member extending into said channels, the bottom portions of said rails being narrower than said channels, flexible walled hoses positioned in said channels and supportingly engaging said rails, said hoses being deformed from round to flattened cross section with rounded sides, the curvature of the bottom of said channels conforming to and substantially equalling the natural deformed shape of said hoses to support the bottoms and sides thereof, the lateral sides of said rails being positioned not substantially outwardly from the centers of curvature of the sides of said hoses, a rigid header connecting and affording communication between said hoses and located in said recess at one end thereof beyond said rails and ribs, a scale housing connected to said base, a hydraulic scale positioned in said housing and hydraulically connected to said hoses, means closing the unconnected ends of said hoses, reenforcing wrappings applied to the exposed ends of said hoses where they project beyond said rails, cover plates secured to said body over the ends of said recess, projections on the ends of said pressure member disposed in spaced relationship below said cover members, a dial on said scale calibrated in weight units corresponding to the unit pressure in said scale multiplied by the area of the bottoms of said rails, a body of liquid filling said hoses, header and scale, and a closable filler opening to said body of liquid, the bottoms of said rails having a known area in full contact with said hoses.

5. A weighing scale comprising, a base having a recess in the top thereof, a plurality of parallel ribs extending along the bottom of said recess and through the mid-portion thereof and forming a plurality of channels with rounded lower corners, a pressure member slidably received in said recess and projecting above said body, a plurality of rails on the bottom of said member extending into said channels, the bottom portions of said rails being narrower than said channels, flexible walled hoses positioned in said channels and supportingly engaging said rails, said hoses being deformed from round to flattened cross section with rounded sides, the curvature of the bottom of said channels conforming to and substantially equalling the natural deformed shape of said hoses to support the bottoms and sides thereof, the lateral sides of said rails being positioned not substantially outwardly from the centers of curvature of the sides of said hoses, means connecting and affording communication between said hoses and located in said recess at one end thereof beyond said rails and ribs, a hydraulic scale hydraulically connected to said hoses, means closing the unconnected ends of said hoses, a body of liquid filling said hoses and scale, and a closable filler opening to said body of liquid, the bottoms of said rails having a known area in full contact with said hoses.

6. A weighing scale comprising, a base having a recess in the top thereof, the bottom of said recess forming an upwardly opening channel with rounded lower corners, a pressure member slidably received in said recess and projecting above said body, a rail on the bottom of said member extending into said channel, the bottom portion of said rail being narrower than said channel, a flexible walled circular hose positioned in said channel and constituting the sole support for said rail, said hose being deformed to flattened cross section with rounded sides, the curvature of the bottom of said channel conforming to and substantially equalling the natural deformed shape of said hose to support the bottom and sides thereof, the lateral sides of said rail being positioned approximately over the centers of curvature of the sides of said hose, a scale housing connected to said base, a hydraulic scale positioned in said housing and hydraulically connected to said hose, means closing the unconnected end of said hose, reenforcing wrappings applied to the exposed ends of said hose where they project beyond said rail, the hose being relatively unreinforced where it is engaged by said rail and the walls of said channel, cover plates removably secured to said body over the ends of said recess, projections on the ends of said pressure member underlying said cover plates, a body of low vapor pressure liquid filling said scale and said hose, and means forming a closable opening to said body of liquid.

7. A weighing scale comprising, a base having a recess in the top thereof, the bottom of said recess forming an upwardly opening channel with rounded lower corners, a pressure member slidably received in said recess and projecting above said body, a rail on the bottom of said member extending into said channel, the bottom portion of said rail being narrower than said channel, a flexible walled circular hose positioned in said channel and constituting the sole support for said rail, said hose being deformed to flattened cross section with rounded sides, the curvature of the bottom of said channel conforming to and substantially equalling the natural deformed shape of said hose to support the bottom and sides thereof, the lateral sides of said rail being positioned substantially inwardly from the vertical planes of the inner surface of the sides of said hose, a hydraulic scale hydraulically connected to said hose, means closing the unconnected end of said hose a body liquid filling said scale and said hose, and means forming a closable opening to said body of liquid.

8. A weighing scale comprising, a base member, a pressure member slidably interfitting with said base member and forming a recess therebetween, one of said members forming a plurality of channels opening to said recess and having rounded inner edges, a plurality of rails on the other of said members extending into said channels, flexible walled circular hoses positioned in said channels and supportingly engaging said rails, said hoses being deformed to flattened cross section with rounded sides, the curvature of the inner edges of said channels conforming to and substantially equalling the natural deformed shape of said hoses to support one face and sides thereof, the lateral sides of said rails being positioned approximately in the vertical planes of the centers of curvature of the sides of said hoses, a header connecting and affording communication between said hoses and located in said recess at one end thereof beyond said rails, a scale housing connected to said base at the opposite end thereof from said header, a hydraulic scale positioned in said housing and hydraulically connected to the other end of one of said hoses, closures for the other ends of the others of said hoses and located in the other end of said recess from said header, reenforcing wrappings applied to the exposed ends of said hoses where they project beyond said rails, a body of liquid filling said hoses, header and scale, and means forming a closable opening to said body of liquid, said rails having a known area in contact with said hoses.

9. A weighing scale comprising, a base member, a pressure member slidably interfitting with said body member and forming a recess therebetween, one of said members forming a plurality of channels opening to said recess and having rounded inner edges, a plurality of rails on the other of said member extending into said channels, flexible walled hoses positioned in said channels and supportingly engaging said rails, said hoses being of flattened cross section with rounded sides, the curvature of the inner edges of said channels conforming to and substantially equalling the shape of said hoses to support the one face and sides thereof, the lateral sides of said rails being positioned substantially inwardly from the sides of said hoses, a header connecting and affording communication between said hoses, a hydraulic scale hydraulically connected to the other end of one of said hoses, closures for the other ends of the others of said hoses, reenforcing wrappings applied to the exposed ends of said hoses where they project beyond said rails, a body of liquid filling said hoses, header and scale, and means forming a closable opening to said body of liquid, said rails having a known area in contact with said hoses.

10. A weighing scale comprising, a base, projections on said base forming a plurality of channels, a plurality of high pressure flexible walled tubes positioned in said channels, a hydraulic gauge connected to one end of one of said tubes, means closing one end of the other of said tubes, means interconnecting said tubes to form a closed chamber including said gauge, a pressure member having rails on its underside freely received in said channels and supported entirely on said tubes, the unsupported walls of said chamber which are uncontacted by said rails and the walls of said channels being inexpansible under pressures created therein at the weight limit of the scale, a body of liquid completely filling said chamber, and means forming a closable opening to said chamber, said tubes being deformed into entirely convex oval shape with their bottoms and sides in supported contact with the walls of said channels, said rails being in full contact with the upper walls of said tubes substantially inwardly from the vertical sides of the insides of said tubes.

11. A hydraulic scale comprising, a base, a tubular pressure element seated against said base and having naturally circular flexible walls, a load member associated with said base and having a flat surfaced rail supported entirely by said element, said element being deformed between said base and said member into fully convex section in full contacting relation with said rail, means closing one end of said element, a fixed volume pressure gauge connected to the other end of said element, a quantity of liquid completely filling said element and said gauge, and means on said base supporting the sides and bottom of said element in opposition to said rail, the side edges of said rail being located substantially inwardly from the side edges of the interior of said element and over an unsupported and freely flexible portion of the wall of said element, the walls of said element which are unsupported by said rails and said base being inexpansible under pressures created at the weight limit of the scale.

12. A hydraulic scale comprising, slidably interfitting base and load members, a flexible walled pressure element interposed between said members, means on one of said members supporting three adjacent sides of said element, a rail on the other of said members supported entirely by the other wall of said element and spaced substantially inwardly from the supported sides thereof, a constant volume pressure gauge connected to and communicating with said element, and a body of low vapor pressure liquid completely filling said gauge and said element, said element having a flattened rounded cross section capable of increasing in area without stressing the walls thereof, said rail having a known area in contact with said element, the walls of said element being reinforced exteriorly of the portion thereof retained between said members sufficiently to resist expansion under the pressure created therein at the weight limit of the scale.

13. A hydraulic scale comprising, slidably interfitting base and load members, a flexible walled pressure element interposed between said members, means on one of said members supporting three adjacent sides of said element, a rail on the other of said members supported entirely by the other wall of said element and spaced substantially inwardly from the supported sides thereof, a constant volume pressure gauge connected to and communicating with said element, and a body of liquid completely filling said gauge and said element, said element having a flattened cross section capable of increasing in area without stressing the walls thereof, said rail having a known area in contact with said element, the walls of said element being reinforced exteriorly of the portion thereof retained between said members sufficiently to resist expansion under the pressure created therein at the weight limit of the scale.

References Cited in the file of this patent

UNITED STATES PATENTS

| | | |
|---|---|---|
| 566,698 | Rabb | Aug. 25, 1896 |
| 1,227,503 | Troll | May 22, 1917 |
| 1,227,505 | Troll | May 22, 1917 |
| 1,227,506 | Troll | May 22, 1917 |
| 1,329,685 | Troll | Feb. 3, 1920 |
| 1,458,920 | Troll | June 12, 1923 |
| 1,494,164 | Goldbeck | May 13, 1924 |
| 2,269,969 | Branick | Jan. 13, 1942 |
| 2,359,721 | Williams | Oct. 3, 1944 |
| 2,501,248 | Williams | Mar. 21, 1950 |
| 2,652,241 | Williams | Sept. 15, 1953 |
| 2,704,661 | Maugh | Mar. 22, 1955 |

FOREIGN PATENTS

| | | |
|---|---|---|
| 231,927 | Great Britain | Apr. 8, 1925 |